United States Patent [19]

Morales

[11] Patent Number: 5,067,930
[45] Date of Patent: Nov. 26, 1991

[54] BICYCLE SPROCKET PROTECTOR

[76] Inventor: Robert Morales, 15561 Product La. D-8, Huntington Beach, Calif. 92649

[21] Appl. No.: 631,333

[22] Filed: Dec. 20, 1990

[51] Int. Cl.$^5$ ............................................. F16H 7/18
[52] U.S. Cl. .................................................... 474/144
[58] Field of Search ...................... 474/140, 144–147; 74/608; 180/84; 280/152.1, 152.2, 160.1

[56] References Cited

U.S. PATENT DOCUMENTS

| | | | |
|---|---|---|---|
| 1,636,327 | 7/1927 | Roe | 474/144 |
| 4,639,240 | 1/1987 | Liu | 474/144 |
| 4,826,468 | 5/1989 | Friedrichs | 474/144 X |

Primary Examiner—Thuy M. Bui
Attorney, Agent, or Firm—Erik M. Arnhem

[57] ABSTRACT

A protector device for the sprocket of a bicycle. A protector device has a curved arcuate configuration that underlies the profile plane of the sprocket when the device is installed on a bicycle. Two struts extend upwardly from the protective device at its leading and trailing ends. Clamps are carried on the upper ends of the struts for attaching the protective device to the bicycle frame. One of the clamps has a swivel connection to the associated strut, to enable the device to be operatively attached to a range of different bicycles.

12 Claims, 1 Drawing Sheet

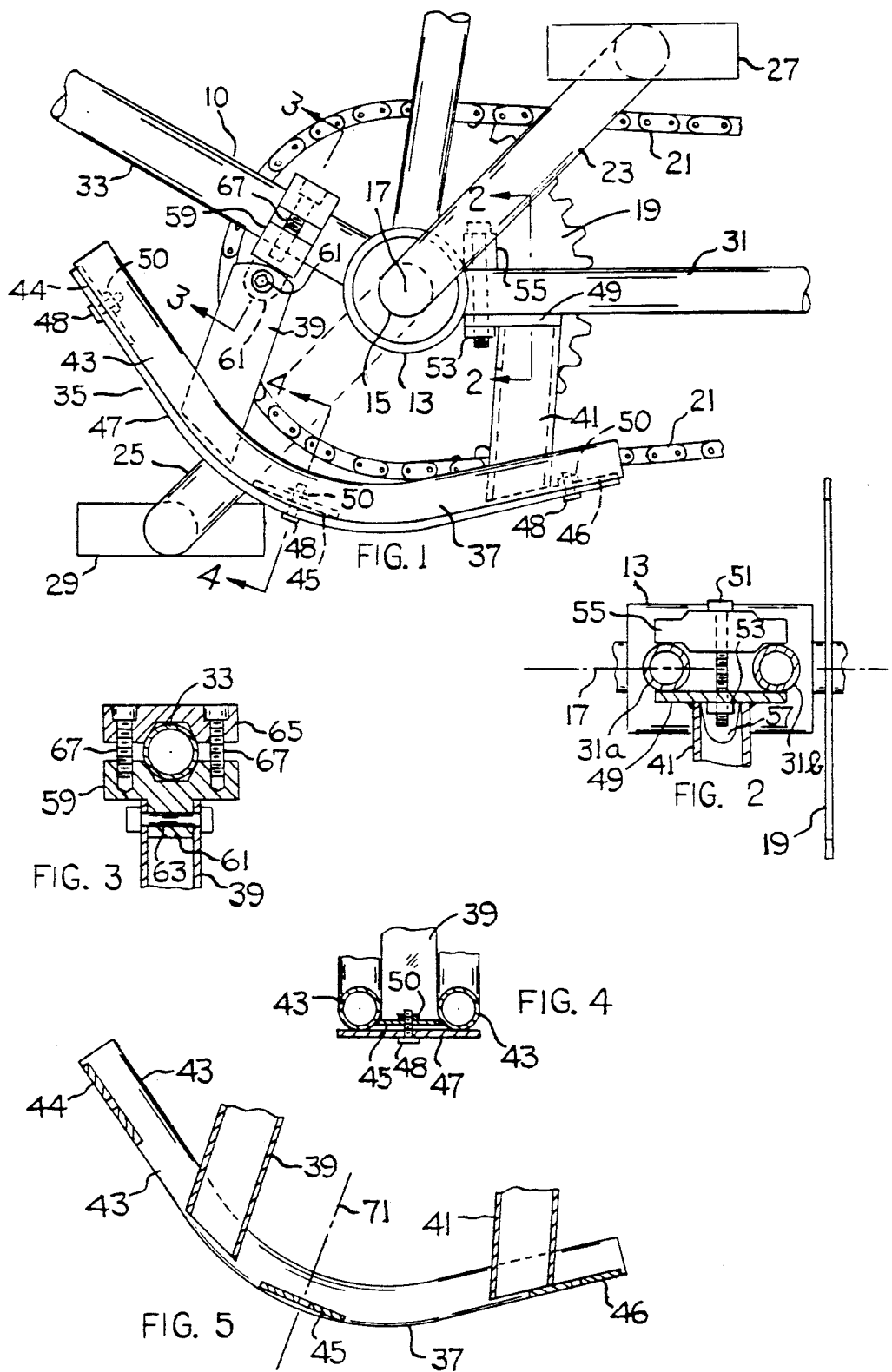

BICYCLE SPROCKET PROTECTOR

BACKGROUND AND SUMMARY OF THE INVENTION

This invention relates to a protector for the sprocket of a bicycle, particularly a bicycle used for competitive rough terrain racing or for acrobatic free style manuevers.

Acrobatic bicycle maneuvering often involves a deliberate movement of the bicycle into an airborne condition. Similarly, during competitive racing over hilly terrain the bicycle can become airborne. When the bicycle returns to the ground it may strike the ground surface at an oblique angle. If the striking angle is severe enough, or if there is a stationary upstanding structure in the path of the bicycle the drive sprocket for the bicycle chain may impact against the stationary structure. A bicycle sprocket is designed to transmit rotary drive forces to the chain, but it is not designed to withstand blows caused by physical impact against stationary structures, e.g. when the bicycle is returning to the ground after an airborne manuever.

It has been proposed to equip bicyles with a protector for the drive sprocket so that airborne maneuvers can be carried out without damaging the sprocket. These sprocket protectors have been designed to fit particular bicycle models, such that any one sprocket protector is confined to use on only a few bicycle models.

The present invention is concerned with a sprocket protector that can fit onto a relatively large number of different bicycle models, thereby reducing inventory requirements and somewhat reducing the average manufacturing cost (due to the ability to use volume production techniques). The protector of the invention has some additional advantageous features, e.g. relatively high strength and low weight, and a reversible and replaceable skid plate construction.

In one form of the invention the protector comprises an arcuate curved protector body equipped with two upstanding struts. The forward one of these struts has a swivel connection to a clamp that is adapted to fit onto the bicycle frame just forwardly from the drive sprocket hub portion of the frame. This swivel connection enables the clamp to fit onto an upwardly angled tubular element of the frame, even though the angulation of the frame element may not be exactly the same from one bicycle to the next. The swivel connection between the clamp and the forwardmost strut constitutes a principal feature of this invention.

The protector body is preferably formed by two laterally-spaced curved tubes. The aforementioned struts have lower ends thereof extending into the space between the curved tubes; the struts are welded to the curved tubes to form a protector body that is relatively strong while at the same time being relatively light.

The lower faces of the curved tubes form a mounting surface for a curved face plate (skid plate) that is essentially coextensive with the tubes. The curved face plate is releasbly connected to the protector body so that it can be replaced after it has become worn, due e.g. to skidding or possible deformation after repeated contact with the ground or other stationary structures. The protector body and face plate are symmetrically formed (configured) so that the face plate can be turned (reversed) end-for-end on the protector body, e.g. in the event that only the front end of the face plate is worn.

THE DRAWINGS

FIG. 1 is a fragmentary side elevational view of a bicycles having one embodiment of the invention installed thereon.

FIG. 2 is a sectional view taken on line 2—2 in FIG. 1.

FIG. 3 is a sectional view taken on line 3—3 in FIG. 1

FIG. 4 is a sectional view taken on line 4—4 in FIG. 1

FIG. 5 is a fragmentary longitudinal view taken through the

FIG. 1 sprocket protector, with parts broken away to emphasize certain features.

DESCRIPTION OF A PREFERRED EMBODIMENT OF THE INVENTION

The drawings fragmentarily show a bicycle that includes a frame 10 comprised of a hub sleeve 13 for supporting an axle 15, such that the axle can rotate around the sleeve axis 17. At its right end (FIG. 2) the axle carried a drive sprocket 19 for a chain 21. Crank arms 23 and 25 extend right angularly from opposite ends of the axle to connect with foot pedals 27 and 29.

Frame 10 further includes a rear fork 31; as seen in FIG. 2 the fork is comprised of two laterally spaced tubular frame elements 31a and 31b, leaving a space between the two frame elements. A tubular front frame element 33 extends forwardly and upwardly from hub sleeve 13 directly away from fork 31. Typically tubular frame element 33 is angled upwardly at approximately thirty degrees, although the angle will vary slightly from one model of the bicyle to another model.

The present invention is concerned more particularly with a protector device 35 designed to be installed on a conventional bicyle to protect sprocket 19 from impact against stationary surfaces during airborne manuevers of the bicycle. The protector device comprises a curved (arcuate) protector body 37 positionable directly below hub sleeve 13, and two struts 39 and 41 extending upwardly from the protector body for attachment to the bicycle frame. A clamp device is associated with each strut for secure attachment of the respective strut to the associated portion of the bicycle frame.

Protector body 37 is comprised of two parallel curved steel tubes 43 spaced laterally apart; each tube has a circular cross-sections. Three connector plates 44, 45 and 46 extend across the space between the two tubes; end areas of the plates are welded to the tubes. Also, the two struts 39 and 41 have their lower ends extending into the spaces between the tubes. Each strut is formed from a rectangular cross-sectioned (square) tube, with the tube cross section having the same width as the spacing between tubes 43. Each tube (strut) 41 or 43 is welded to both curved tubes 43, such that the struts and protector body form a rigid unitary protective device. Transverse plates 44, 45 and 46 are used as devices to mount (attach) a curved face plate 47 on the underside of protector body 37. The curvature of plate 47 is the same as the curvatures of tubes 43 so that plate 47 has extensive area contact with the tubes. FIG. 1 shows face plate 47 attached to protector body 37; FIG. 5 shows the protector body with the face plate removed. Screws 48 and nuts 50 are used to attach plate 47 to body 37.

FIG. 2 shows details of a clamp that can be used to removably attach rear strut 41 to bicycle fork 31. A flat abutment plate 49 is welded onto the upper end of tubular strut 41 for positionment flatwise against the undersurfaces of fork tubes 31a and 31b. A screw 51 and nut 53 are used to draw clamp element 55 downwardly onto the fork tubes, to thereby hold strut 41 in the FIG. 1 position. A clearance hole 57 may be formed in the front wall of the tubular strut to facilitate placement of the nut on the screw. Abutment plate 49 is positioned so that its front edge is in close proximity to the surface of hub sleeve 13.

The frontmost tubular strut 39 is attached to bicycle frame element 33 by the clamp structure shown in FIGS. 1 and 3. They clamp structure comprises a block element 59 having a hinge knuckle 61 extending downwardly into the hollow space within the square tube (strut) 39. A pivot pin 63 extends transversely through the hinge knuckle and opposed tube walls, such that block element 59 is free to swing around the pin 63 axis; the pin forms a swivel connection between block element 59 and strut 39. The clamp structure is completed by an upper clamp element 65 and two clamp screws 67 that extend downwardly through smooth holes in element 65 into threaded holes in block element 59.

Although there is a swivel connection between clamp element 59 and strut 39, nevertheless, the sprocket protector is rigidly attached to the bicycle frame when screws 67 are threaded into element 59. When the two clamp elements 59 and 65 are tightened onto tubular frame element 33 strut 39 no longer can swivel relative to element 59.

Struts 39 and 41 have their respective axes extending approximately vertically, but with a slight rearward tilt in the upward direction. Each strut is oriented to absorb blows on the undersurface of face plate 47 associated with downward airborne movement of the bicycle while the bicycle is moving in a forward direction. The rearward tilt of strut 39 is about twenty degrees; the rearward tilt of strut 41 is about five degrees. Strut 39 is attached to curved protector body 37 at its leading portion. Strut 41 is attached to protector body 37 at its trailing portion. In side profile, curved body is located below the profile plane of sprocket 19, such that during downward airborne motion of the bicycle the protector device will strike any object (wall, ledge, large rock, etc.) prior to any impact of the sprocket against the object.

Face plate 47 is removable and replaceable, as by disconnection of screws 48 from nuts 50. Also, face plate 47 is reversible end for end. Reversibility may be appropriate when (if) the leading (front) portion of the plate is worn while the trailing (rear) portion is relatively unworn.

Plate reversibility is made possible by the fact that the screw holes in connector plates 46 and 44 are the same distance from the screw hole in plate 45; additionally the curvatures on tubes 43 and plate 47 are symmetrical around an imaginary central reference plane 71 taken through a midpoint along each tube 43 (FIG. 5). In FIG. 5, the portions of tubes 43 to the right of reference plane 71 are mirror images of the tube portions to the left of the reference plane. Curved face plate 47 can be secured to the convex surfaces of tubes 43 with either end of the plate at the forward end of the tube assembly.

Circular tubes 43 act as beams to provide a relatively strong but lightweight protector body structure. Face plate 47 acts as the contact skid surface, but tubes 43 and struts 39 and 41 absorb the skid force. Beam elements 43 could be formed from bar stock or tube stock having a non-circular cross section. Other structural modifications could be used while still practicing the invention.

A major feature of the invention is the swivel connection between front strut 39 and the associated clamp element. The swivel connection enables the clamp element to firmly fit onto bicycle front frame elements 33 having a range of different upward angulations.

What is claimed is:

1. A protector for the sprocket of a bicycle, wherein the bicycle comprises a frame that includes a hub sleeve having an axis transverse to the plane of the frame, an axle extending through said sleeve on said axis, a horizontal axis sprocket carried on said axle outboard from said sleeve, a rear fork extending generally horizontally from said hub sleeve in a rearward direction, and a front frame element extending forwardly and upwardly from said sleeve directly away from the rear fork:

said protector comprising a curved protector body positionable directly below said hub sleeve said curved body having a concave face presented upwardly toward the hub sleeve and a convex face presented downwardly toward the ground surface; said curved body having a leading portion located below the front frame element of the bicycle and a trailing portion located below the rear fork of the bicycle; a first strut extending upwardly from the leading portion of the curved body; a first clamp having a swivel connection with said first strut, said first clamp having means thereon for tightening the clamp around the front frame element; a second strut extending upwardly from the trailing portion of the curved body; and a second clamp carried on said second strut for clamping engagement with the rear fork of the bicycle; said clamps being individually disengageable from the bicycle frame to enable the protector to be removed from the bicycle or installed on the bicycle without altering the bicycle structure.

2. The protector of claim 1, and further comprising a replaceable face plate carried on the convex face of the protector body.

3. The protector of claim 2, wherein said protector body comprises two curved tubes extending parallel to each other in spaced apart relation; said replaceable face plate being a curved plate having the same curvature as the curved tubes; said curved plate having a concave surface thereof engaged with both curved tubes so that the tubes act as reinforcements for the face plate 4. The protector of claim 3, and further comprising a first connector plate extending between the curved tubes at the leading portion of the protector body; a second connector plate extending between the curved tubes at the trailing portion of the protector body; and screws extending through face plate and each connector plate, whereby the face plate is detachably secured to the protector body.

5. The protector of claim 4, wherein the curved tubes have curvatures that are mirror images of each other when measured from a transverse reference plane taken through a midpoint along the tube, whereby the face plate can be reversed end for end and operatively engaged with said curved tubes.

6. The protector of claim 5, wherein each connector plate has a screw hole extending therethrough; each said screw hole being spaced the same distance from the transverse reference plane.

7. The protector of claim 1, wherein each strut is a hollow rectangular cross section tube.

8. The protector of claim 7, wherein said first clamp comprises a block element having a hinge knuckle extending downwardly into the associated hollow rectangular tube; said swivel connection comprising a pivot pin extending transversely through said hinge knuckle and the associated tube.

9. The protector of claim 8, wherein said second clamp comprises an abutment plate extending transversely across the associated rectangular tube for positionment flatwise against the undersurface of the bicycle rear fork.

10. The protector of claim 9, wherein each hollow rectangular tube has its axis extending approximately vertical, but with a slight rearward tilt in the upward direction, whereby the tubes are oriented to absorb blows associated with downward motions of the bicycle while it is moving in a forward direction.

11. The protector of claim 1, and further comprising a replaceable face plate carried on the convex face of the protector body; said protector body comprising two laterally-spaced curved beams extending parallel to each other outboard from the general plane of the protector body; said replaceable face plate being a curved plate spanning the curved beams and extending therealong; said curved plate having a concave surface facially engaged with longitudinal surfaces of the beams so that the beams act as reinforcements for the face plate.

12. The protector of claim 11, wherein each strut is a hollow rectangular cross-sectioned tube; each rectangular tube having a lower end thereof extending into the space formed between the curved beams; each rectangular tube having a weld connection with both curved beams, whereby the beams and struts form a rigid unitary protective structure for the bicycle sprocket.

* * * * *